Dec. 1, 1959  R. P. VAELL  2,915,336
SOLIDS CONVEYANCE PROCESS AND APPARATUS
Filed July 23, 1957
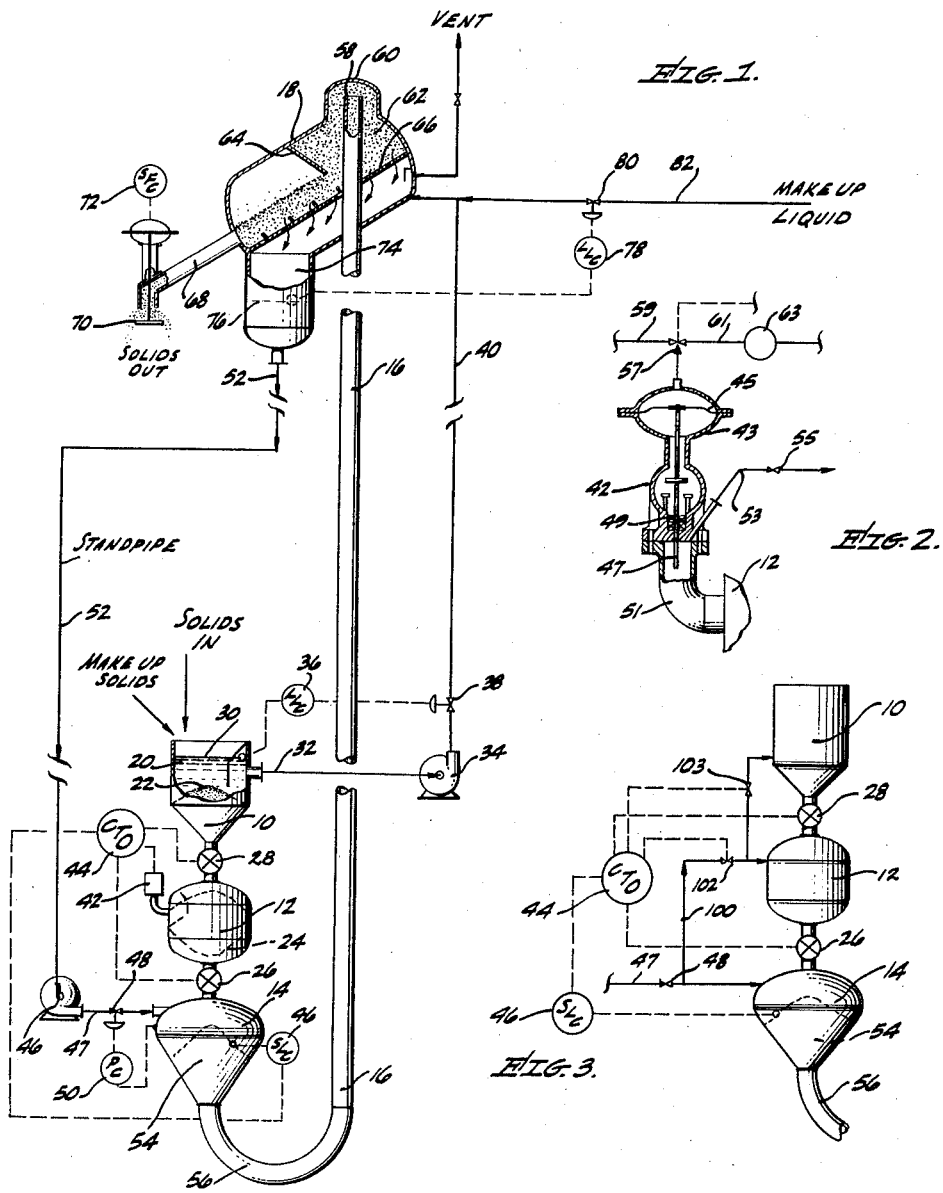
INVENTOR.
RAOUL P. VAELL,
BY
ATTORNEY.

United States Patent Office 2,915,336
Patented Dec. 1, 1959

2,915,336

SOLIDS CONVEYANCE PROCESS AND APPARATUS

Raoul P. Vaell, Hollywood, Calif., assignor to Union Oil Company of California, Los Angeles, Calif., a corporation of California Application July 23, 1957, Serial No. 673,723

17 Claims. (Cl. 302—14)

This invention relates to the conveyance or transportation of granular solids and in particular relates to a process and apparatus for the movement of such solids in substantially compact form as a continuous moving phase through a conduit under the influence of a concurrently depressuring conveyance fluid.

Conventionally, granular solids are conveyed by moving mechanical equipment such as bucket elevators, the various forms of belt conveyors, and other apparatus such as open or enclosed drag lines. For atmospheric pressure operations such mechanical equipment adequately serves to transport the granular solids at moderate rates. However, when the solids are desirably transported at high flow rates, or in connection with processes in which the solids are to be conveyed in contact with fluids under pressure, or in processes where the attrition loss of granular solids must be kept at a minimum, numerous disadvantages of such mechanical conveyances present themselves. Among these problems is the size of the equipment necessary to transport large quantities of granular solids. For example, bucket elevators necessary to transport cracking catalyst at a rate of about 150 tons per hour are approximately 4 feet in length, 1 foot in width, and 1.5 feet deep. Furthermore, the maintenance of the necessary driving mechanism at temperatures of the order of those in the cracking processes is difficult and expensive, and the quantity of the granular solids lost by attrition in loading and unloading the buckets is frequently excessive. To overcome some of these problems, the solids may be handled as relatively dilute suspensions in gaseous streams, however, the particle velocities are high and this causes excessive equipment erosion and solid particle attrition.

To overcome these disadvantages, a new advance in solids conveyance involves the movement of solids through conduits while the solids are maintained in a dense or compact condition, a condition in which their bulk density while in motion is substantially the same as the bulk density of the solids when at rest. The movement of the solids is effected by means of a concurrent flow of fluid introduced at the inlet of the conduit under relatively high pressure and discharged at the outlet with the solids at a relatively low pressure. The applied pressure differential between the inlet and the outlet of the conveyance zone is such that the fluid flows through the interstices of the solid mass at a rate sufficient to generate a pressure gradient throughout the mass which in turn is sufficient to overcome forces of friction and gravity opposing movement of the solids. This establishes a net conveying force in the desired flow direction which is effective at every point throughout the entire solids mass. Motion of the solids is maintained by maintaining the overall pressure differential, by supplying solids at the inlet to be conveyed, and by removing solids after conveyance at a controlled flow rate at the outlet of the line. This type of solids conveyance is characterized by an extremely low attrition rate since there is substantially no solids motion of one particle relatively to another, the actual lineal velocity of each particle is the same and of relatively low value, and no particle-to-particle or particle-to-surface impact occurs. Relatively high flow rates are permitted in relatively small sized conduits.

The present invention is an improvement in this dense or compact flow type of conveyance in which a liquid conveyance fluid is employed to generate the pressure gradient and which is handled in the process in such a manner so as to permit reductions in power requirement to convey a given quantity of solids a given distance to between about 5 and 10% of the power required in the analogous situation employing gaseous conveyance fluids. The invention is further characterized by a substantial reduction in the complexity of the mechanical equipment, and accordingly a reduction in the cost, to about 60% of that required when gaseous fluids are used. Substantial advantages also result by applying the principles of this invention to the dilute phase or "gas-lift" types of pneumatic conveyance.

It is therefore an object of the present invention to provide an improved method for the conveyance of granular solids through relatively small sized equipment at relatively high volumetric flow rates without the disadvantages inherent in moving mechanical conveyors.

It is an additional object of this invention to provide a method for the conveyance of granular solids in which no moving mechanical equipment is employed and the conveyance is effected by a depressuring concurrent flow of a conveyance liquid through a conduit carrying the granular solids either as a relatively dilute suspension or in substantially compact form.

It is a specific object of this invention to provide for the conveyance of solids through elongated conveyance conduits by means of a liquid conveyance fluid recirculated in the system whereby only a fraction of the total pressure differential required between the inlet and the outlet of the conveyance zone need be generated by the pump which recirculates the conveyance fluid thereby substantially reducing the conveyor power requirement.

It is another object of this invention to provide an improved apparatus for accomplishing the above-mentioned objects.

Other objects and advantages of the present invention will become apparent to those skilled in the art as the description and illustration thereof proceed.

Briefly, the present invention comprises an improved solids conveyance process wherein the granular solids are introduced into an elongated conveyance zone, are conveyed therethrough by means of a concurrently depressuring conveyance fluid and are maintained during conveyance in substantially compact form. (The condition of granular solids designated as "substantially compact form" is hereinafter more specifically defined or described in connection with tests for determining the existence or non-existence of such condition.) The depressuring conveyance fluid flowing through the interstices of the porous granular moving mass generates a pressure gradient throughout the mass in the direction of solids and fluid flow which, if sufficient in magnitude, causes solids motion by overcoming opposing forces of gravity and friction. The ratio of the force of the pressure gradient to the opposing gravitational force only in a conveyance zone is called the conveyance force ratio and is given by $$\frac{\frac{dp}{dl}}{\rho s \cos \theta}$$

wherein $\frac{dp}{dl}$ is the pressure gradient along the length of the conveyance zone in pounds per square foot per foot, $ps$ is the bulk density of the granular solids in pounds per cubic foot, and $\theta$ is the angular deviation of the conveyance zone from a vertical upward reference axis. (Other consistent units may be substituted.) This ratio is 1.0 when the conveyance force is equal to the opposing gravitational force acting along the axis of the conveyance zone. Thus a vertical conveyance zone requires a greater pressure gradient than a sloping or a horizontal conveyance zone. These theoretical minimum values must be exceeded to overcome friction forces to cause solids motion. Usually the ratio in typical conveyance zones in accordance with this invention is between about 1.01 and about 2.0 and for maximum conveyance efficiency is maintained substantially constant, preferably at the lowest values at which friction also is overcome throughout the conveyance zone by means described below.

The conveyance fluid is a liquid which is selected primarily on the basis of compatibility with the solids being conveyed, and of course on the basis of low cost. In most cases, water is the most logical fluid to use for obvious reasons. In some cases however, the particular solids being conveyed may be incompatible with liquid water, for example catalyst solids, or water soluble solids, or the like. Accordingly, the present invention is not to be understood as restricted to the use of water alone since it is obviously applicable to other common or even uncommon liquids. In certain specific instances aqueous solutions of salts and other materials may be employed. Organic liquids such as hydrocarbons, alcohols, ketones and other materials may be required for the conveyance of the particular solids. It is also within the scope of this invention to employ other liquids such as the liquid or molten metals. In any event, the liquid is selected on the basis of compatibility with the solids, and by compatibility is meant freedom from adverse effects to the equipment or to the solids or to the liquid under the conditions of conveyance.

The present invention is best described in further detail by reference to the accompanying drawings in which:

Figure 1 is a schematic flow diagram of the conveyance process of this invention in which are also shown the several essential mechanical elements of the apparatus of this invention.

Figure 2 is a detailed drawing of a portion of the apparatus by means of which solids are pressured into the entrance of the conveyance conduit, and Figure 3 is a fragmentary drawing of the lower portion of the apparatus by means of which solids are introduced into the conveyor.

Referring now more particularly to Figure 1, the description will be conducted in the form of a practical example of the process and apparatus of this invention as applied to the conveyance of steel shot by means of liquid water as the conveyance medium, the shot being delivered to an elevated point in connection with boiler equipment for steam generation in order to ripple down over the boiler tubes in the fire box whereby the external surfaces of the tubes are freed of accumulated solids. Since the fire box and boiler tubes are standard equipment and do not form any part of the present invention, these elements are not shown in Figure 1. The invention is not to be limited to this single conveyance application, however, as obviously it is applicable to others.

In Figure 1 the essential apparatus elements include solids hopper 10, solids pressuring chamber 12, induction chamber 14, an elongated conveyance conduit 16, and an elevated solids receiving and conveyance liquid separator. The solids to be conveyed together with any makeup solids required in the process are introduced by any suitable means into hopper 10 in which is maintained a body of conveyance liquid 20. The conveyance liquid is also selected on the basis of its having a density less than that of the solids to be conveyed. Accordingly the solids sink forming an accumulation 22 in the lower portion of hopper 10.

Although the solids flow in the system from induction chamber 14 may be continuous, at least over even fairly short operating intervals, the introduction of the solids to be conveyed into induction chamber 14 may be intermittent. In this case, hopper 10 and induction chamber 14 comprise surge chambers in each of which the solids level rises and falls due to the intermittent introduction, pressuring, discharge, and depressuring steps which take place in pressuring chamber 12.

This cycle is continued at a rate sufficient to maintain a solids level at all times somewhere in induction chamber 14. With the solids level in pressuring chamber 12 at the position indicated by 24 and with the liquid pressure existing therein equal to that maintained in induction chamber 14 due to the fact that valve 26 has just been opened to allow the solids to charge into induction chamber 14, valve 26 is closed isolating pressuring chamber 12. Valve 28 is then opened allowing pressuring chamber 12 to depressure into hopper 10 and solids flow downwardly through this valve into the presurring chamber. There is simultaneously with this depressuring and solids flow, a flow of water displaced by the added solids upwardly from chamber 12 into hopper 10. To prevent liquid level 30 from rising to excessive heights due to this liquid displacement, outlet line 32 and pump 34 are provided together with liquid level controller 36 and valve 38 by means of which the net accumulation of liquid in hopper 10 is returned through line 40 to an elevated reservoir hereinafter more fully described.

With pressuring chamber 12 substantially filled with a charge of solids and the remaining space filled with liquid water, valve 28 is closed again isolating the chamber. Pressuring means 42 is then activated which displaces sufficient additional water into pressuring chamber 12 to raise the pressure to a value equal to that maintained in induction chamber 14. The mechanical details of pressuring means 42 are outlined in the description of Figure 2. Valve 26 is then opened, the pressures in vessels 12 and 14 being equal, the solids flow downwardly through valve 26 and collect in induction chamber 14 for conveyance. They displace liquid from chamber 14 upwardly through valve 26 into chamber 12, from which it is displaced into hopper 10 by the solids entering from the hopper. Thus a volume of liquid is displaced into and pumped from hopper 10 which is equal to the absolute or displacement volume of solids conveyed. After the foregoing steps, the equipment is in the condition assumed in the beginning of the cycle. The cycle continues with the closing of valve 26, the opening of valve 28, and the introduction of more solids into vessel 12 from hopper 10.

The timing of the operations of valves 26 and 28 and pressuring means 42 is controlled by means of cycle timer operator 44 in response to solids level controller 46. In this way if the average solids level in induction chamber 14 appears to controller 46 to be gradually dropping after several cycles, then operator 44 accelerates the sequence of solids pressuring previously described so as to keep a solids level in induction chamber 14.

With the substantially continuous supply of solids to be conveyed being introduced into induction chamber 14 in the manner named, pump 46 supplies the conveyance liquid at a rate controlled by valve 48 in response to pressure controller 50 whereby the desired fluid pressure at the inlet of conveyance conduit 16 is maintained. Pump 46 receives the conveyance fluid after discharge thereof at the outlet of the conveyance conduit and its separation from the conveyed solids in a manner hereinafter described. In any event, this liquid stands in standpipe 52 to a height which is substantially equal to the height of the conveyance conduit and thereby applies a relatively high hydrostatic head to the suction side of pump 46.

The conveyance fluid passes downwardly under the influence of pump 46 in induction chamber 14 and engages with and passes through the interconnected interstices of the mass of solids 54 in the induction chamber. The fluid and solids flow concurrently downwardly through arcuate conduit section 56 and then upwardly through conduit 16. The solids and the fluid are discharged from upper outlet opening 58 which is spaced between about 0.5 and 2.0 outlet opening diameters from roof 60 of solids receiver and fluid separator vessel 18. The solids and fluid reverse their flow direction to a downward direction at this point. The mass of discharged solids 62 passes downwardly by gravity between inclined baffle 64 and foraminate baffle 66. The solids then change direction and continue downwardly by gravity across the surface of baffle 66 toward the left and are removed by means of line 68 at a rate controlled by valve 70. The solids discharge rate is controlled by solids flow controller 72 and since the solids move as a compact mass from valve 70 backwards through the entire apparatus, the flow rate determined by valve 70 determines the conveyance rate in conveyance conduit 16. It also maintains the portion shown in Figure 1 of vessel 18 full of compact solids. In so doing roof 60 constitutes a restriction on the discharge rate of solids from conduit 16 which thereby maintains the solids in that conduit in their maximum packed density condition.

The liquid conveyance fluid flows by gravity in the same direction as the solids previously described except when it leaves baffle 66. This baffle is inclined so as to permit gravity movement of solids across its upper surface, and it is also perforated to permit gravity flow of the conveyance liquid through the baffle into the lower or reservoir 74 portion of vessel 18. Standpipe 52, to which reference has previously been made, opens from the lower portion of reservoir 74 and extends downwardly into the inlet of conveyance liquid pump 46. Liquid level 76 is maintained in reservoir 74 by means of liquid level controller 78 and valve 80 which is provided in makeup liquid line 82.

Conveyance liquid is accumulated in reservoir 74 from three principal sources. The main stream is that discharging through baffle 66 after separation by gravity from the solids discharged from the conveyance conduit outlet. The second source is by means of pump 34 and line 40 which is equal to the displacement volume of the solids being conveyed. This latter volume is the volume of water being displaced from hopper 10 when solids are introduced and submerged therein. The third source is the makeup water line 82 by means of which losses of liquid from the system are overcome.

In a conveyor conduit which is conveying steel shot through an elevation of approximately 100 feet at a rate of about 10 tons per hour, the conveyance conduit required is about 3 inches inside diameter and the liquid conveyance fluid flow rate through the conduit is about 14.5 g.p.m. (gallons per minute). The displacement fluid flow rate which intermittently passes from vessel 14 to vessel 12 to hopper 10 and out line 32 is 5.2 g.p.m. average. The pressure differential between the inlet and the outlet of the conveyance conduit necessary to convey the solids is about 350 p.s.i. Conveyance pump 46 however need not generate this pressure differential by means of power supplied to it since a hydrostatic head of about 45 p.s.i. is applied through standpipe 52 from reservoir 74. Furthermore, because there are no substantial energy losses due to fluid compression and expansion, the horsepower requirement of pump 46 is reduced to approximately 5 horsepower, compared to a compressor horsepower requirement of about 100 to effect the same conveying job with air. Incidentally, it should be noted that if the conveyance fluid were air or other gas, the conveyance conduit should be tapered, that is provided with an increasing cross sectional area with distance from its inlet to minimize the power required to convey the solids. The cost of the equipment necessary to convey these solids at these rates using a liquid conveyance fluid which is pumped through this system is only about 60% of that for the apparatus using air or other gas as the conveyance fluid and a compressor.

Referring now more particularly to Figure 2, typical details of a device indicated generally as 42 in Figure 1 is shown by means of which the pressure of liquid filling the void space in pressuring vessel 12 during the pressuring step is shown. This device consists of the headworks 43 of a conventional diaphragm valve including diaphragm 45, valve stem 47, packing 49, etc. Stem 47 extends downwardly into elbow 51, which opens into vessel 12 as shown in Figure 1. Elbow 51 is provided at its top end with bleed line 53 controlled by valve 55 by means of which all gas pockets are eliminated. The diaphragm valve is pressured and vented through three-way valve 57 operated remotely by cycle timer operator 44 shown in Figure 1. Vent line 59 and pressure line 61 are included. When vented, stem 47 rises by depressuring liquid in elbow 51 and vessel 12. To pressure these elements, valve 57 is activated, stem 47 is depressed farther into the body of liquid in elbow 51 and vessel 12 and raises the liquid pressure by displacement. A pressure regulator 63 in supply pressure line 61 regulates the value to which the liquid pressure will rise in vessel 12.

Referring finally to Figure 3, a fragmentary view of the lower portion of the apparatus shown in Figure 1 is also shown to illustrate a modification of the intermediate pressuring apparatus. Elements which are also shown in Figure 1 are here indicated by the same numbers and their description will not be repeated. The fundamental difference between this apparatus and that shown in Figure 1 involves line 100 and valve 102 which open from main conveyance fluid line 47. Instead of using positive displacement and liquid compression to raise the pressure in intermediate pressuring vessel 12, operator 44 opens valve 102 briefly thereby bringing it to the same pressure which exists in induction vessel 14. Thereafter, valve 103 opens venting vessel 12 to hopper 10. An equivalent three-way valve may of course be substituted for valves 102 and 103. The valve then closes. The cycle continues as previously described.

Another modification of vessel 12 pressuring involves the use of plug cocks for valves 26 and 28. They permit the flow of the pressuring liquid directly into and from vessel 12 through the same lines that the solids flow.

The preceding discussion has centered about the conveyance of a dense or compact mass of solids by means of a liquid conveyance medium to effect a substantial reduction in conveyor power requirement. In conventional dilute phase or "gas-lift" conveyors, there are similar power reductions obtainable through application of the principles of this invention. The apparatus for such dilute phase lift would be as shown in Figure 1 with the only process change being the removal of solids from vessel 18 controlled to keep it from filling with dense solids bed 62. In addition, substantial reductions in the pressure head to be generated can be realized since these conveyors are characterized by relatively low pressure drops and relatively large volumes of fluid flow. The hydrostatic head recovery through the standpipe may amount to as much as 95% of the lift line pressure drop. Of course, in either case, this is effected by the absolute density of the solids being conveyed, the steel shot above having a very high density and therefore requiring a considerably higher line pressure drop than with most solids.

In the present specification the term "substantially compact form" is intended to indicate a mass of solids having an operating bulk density which is substantially the same as the vibrational static bulk density of the solids determined when at rest and in the absence of moving fluids. To determine whether or not the solids in a conveyance line or any portion thereof are moving in substantially compact form, resort may be had to any one of the following methods, which involve determination of bulk densities directly, or differential pressures, or changes in differential pressures with changes in flow rate of the conveying fluid. The first method to be discussed involves direct measurement of bulk densities.

The usual determination of the bulk density of granular solids is made in a vessel of known volume by applying vibrational forces to a known mass of solid granules. It is indicated that the moving solids in the apparatus of this invention are in the form of a continuous porous mass having an operating bulk density which is substantially the same as this vibrational bulk density.

The granular solids are conveyed in this state by means of a conveyance fluid depressuring through the substantially compact moving mass of granular solids so that substantially no fluidization or aeration or expansion of the porous mass of solids occurs to change the bulk density of the moving mass from this value.

It is recognized that the bulk density of a mass of granular solids is not always constant, but varies with the geometry of the particle arrangement. For example, a given mass of uniform spherical granules will have the least bulk density when systematically packed with particle centers coinciding with the corners of a cube (cubic packing—pore volume 47.64%)[1] and the greatest bulk density (about 41.5% greater when uniformly packed with particle centers coinciding with the apexes of a tetrahedron (rhombohedral packing—pore volume 25.95%).[1] The bulk-density of solids during conveyance according to this invention is intermediate between the bulk densities of solids uniformly packed according to the foregoing systems and is apparently a random mixture of several packing geometries. Similar density variations occur in packings of non-uniform and irregular particles.

In the conveyance system of the present invention such differences in packing arrangement apparently exist but they rarely if ever cause the bulk density of the moving solids to decrease more than 20% of the at-rest vibrational packed value and usually the decrease does not exceed about 5% of this value.

To illustrate the magnitude of the solids bulk density variation the following data are given typical of an operation for conveying compact solids:

Conduit height, feet _____ 27.25
Conduit attitude _____ Vertical.
Conduit diameter, inches:
    Inlet _____ 3.068.
    Outlet _____ 4.000.
Conveyance fluid _____ Air.
Solids mesh size _____ 4–10.
Solids flow rate, lb./hr. _____ 4,500.
Solids vibrational bulk density, lb./cu. ft. ____ 46.7.

Upon depressing the conveyance fluid from the bottom of the conduit while preventing further introduction of solids thereinto, it was noted that the solids level dropped only 0.25 feet from the solids outlet at the top of the 27.25 foot line, indicating an operating solids bulk density of 46.3 pounds per cubic foot during conveyance. This is approximately on 0.85% decrease from the static value and in most cases the decrease is less than 2%.

Thus the operational density of the flowing solids may be determined simply by depressuring the conveyance conduit from the inlet end so as to prevent continued introduction of solids from the induction chamber into the conduit proper and observing the change in position of the solids level at the conduit outlet as was done in obtaining the data above. The operating bulk density of the solids then may be calculated by multiplying the static vibrational bulk density determined as previously described, by the ratio of the volume of that portion of the conduit remaining full of solids to the total volume of the conduit.

[1] Micromeritics—J. M. Dalla Valle (1943), p. 105.

If more convenient, or as a check determination, the operating bulk density may also be determined by depressuring the conduit as above, removing the granular solids from the entire conduit, weighing this material and dividing the weight by the volume of the conduit in question.

Another test for determining whether or not the flowing solids are in substantially compact form consists in observing the change in differential pressure over a selected length of the conveyance conduit effected by changing the rate of flow of the conveyance fluid. In fluidized or aerated solids suspensions and the conventional gas lift processes, increases in aeration or conveyance fluid flow decrease the density of the suspension being conveyed and correspondingly decrease this differential pressure, while in the method of this invention increases in conveyance fluid flow rate through the compact solids increase the differential pressure markedly. This characteristic distinguishes the compact state of the granular solids flowing according to this invention from dense phase aerated suspensions of solids. For example, in a 140 foot long conduit carrying 500 tons per hour of compact granular cracking catalyst by means of compressed air, the pressure differential is 49.6 pounds per square inch. A 10% increase in the volume of air injected into the inlet of the conduit raises the differential pressure to 60 pounds per square inch. By comparison, a 140 foot conduit conveying 82,200 pounds per hour of 12–30 mesh adsorbent carbon as a dilute suspension in air the pressure differential is 1.12 pounds per square inch and a 10% increase in the air input decreases the pressure differential to 0.99 pound per square inch. Similarly, in aerated or so-called 'fluidized" systems the pressure differential decreases with increase in gas velocity. Thus, it is seen that the magnitude of the pressure differential is on the order of 50 times greater in conveyance of compact solids than in dilute suspensions and in many cases is considerably greater. Furthermore, this pressure differential changes positively (increases) in the conveyance of substantially compact solids and negatively (decreases) in the conveyance of fluidized suspensions of solids with increases in conveyance fluid flow rate.

Still another test for "substantially compact form" involves measuring the pressure drop per unit length along the conduit and calculating the conveyance force ratio therein. This ratio is:

$$\frac{\frac{dp}{dl}}{\rho s \cos \theta}$$

(the terms of which are given elsewhere herein). Except in relatively rare cases when the operating bulk density is decreased by an amount approaching 20% of the vibrational bulk density $\rho s$, due to packing rearrangements of the compact solids and the ratio thus determined, may be as low as 0.8, the conveyance force ratio as thus calculated exceeds 1.0 for conveyance of substantially compact solids whereas in a conduit carrying an aerated suspension a very considerably lower value of $$\left(\frac{dp}{dl}\right)$$

and a conveyance force ratio well below 1.0 based on the vibrational bulk density is found. Both compact and aerated solids may exist in the same conduit and is a desirable operation in such processes as contact coking wherein the solids increase in size during operation. The increased solids attrition due to the aeration reduces this particle size and may be controlled to balance one effect against the other. In most other cases it is desirable to maintain the entire mass of solids in compact form for minimum energy requirement and solids attrition rate.

Thus in the present invention, the granular solids are conveyed in substantially compact form by means of a concurrently depressuring conveyance fluid, if the operating bulk density is not more than 20% less than the static vibrational bulk density, or if there is an increase in pressure differential with increase in fluid flow rate, or if the conveyance force ratio is greater than 1.0.

Each solid particle is continuously in direct contact with several other particles surrounding it and is not free to move relative to them differentiating those conveyance operations in which the solids are aerated, fluidized or otherwise suspended in a fluid and have operating bulk densities always considerably less than 80% of the vibrational or static bulk density.

The solids to inner conduit wall angle of repose $\alpha°$ is defined as the maximum inclination (with respect to a horizontal plane) of a conduit full of granular solids at which the granular solids will not flow therethrough by gravitational forces alone. Gravity flow of solids can occur only when a conduit has an inclination greater than $\alpha°$. In all other flow directions a conveyance force is required to cause motion. Such other flow directions pass through the apex of and are included in the solid angle formed from rotating about a vertical axis the $(90+\alpha)°$ angle struck downward from that axis. The process and apparatus of the present invention is primarily applicable to the conveyance of granular solids in directions included in the solid angle defined above, but it also is applicable though part of the conveyance path is along a direction outside this solid angle.

A particular embodiment of the present invention has been hereinabove described in considerable detail by way of illustration. It should be understood that various other modifications and adaptations thereof may be made by those skilled in this particular art without departing from the spirit and scope of this invention as set forth in the appended claims.

I claim:

1. In a process for the conveyance of solid particulate matter which comprises engaging the solids with a conveyance fluid and passing said fluid and solids concurrently through an elongated conveyance zone to a higher elevation, wherein said conveyance fluid is a liquid of lower density then said solids, the improvement which comprises passing solids to be conveyed into an induction zone communicating with the inlet of said conveyance zone, pumping said liquid from an elevated reservoir zone into said induction zone and with said solids through said conveyance zone, separating said liquid from said solids in a separation zone at said higher elevation, restricting the flow of solids at the outlet of said separation zone so as to maintain a dense mass of said solids substantially at their static bulk density extending from said outlet of said separation zone to the outlet of said conveyance zone and throughout said conveyance zone, and passing the separated liquid from said separation zone to said reservoir zone.

2. A process according to claim 1 wherein said reservoir zone is at substantially the same elevation as said separation zone.

3. A process according to claim 1 in combination with the step of controlling the flow rate of said liquid to maintain a value of:

$$\frac{\frac{dp}{dl}}{ps \cos \theta}$$

greater than 1.0, wherein $$\frac{dp}{dl}$$

is the pressure gradient in pounds per square foot per foot, $ps$ is the static bulk density of said solids in pounds per cubic foot, and $\theta$ is the angular deviation of the conveyance direction from a vertical upward reference axis.

4. A process according to claim 1 in combination with the steps of first passing solids to be conveyed into a hopper zone, intermittently flowing solids therefrom into a sealable pressuring zone, increasing the pressure therein, and intermittently passing the pressured solids into said induction zone.

5. A process according to claim 4 in combination with the step of pumping liquid from said hopper zone to said reservoir zone at a volumetric rate substantially equal to the displacement volume of said solids.

6. A process according to claim 4 wherein said pressuring zone is pressured by first isolating it from said hopper zone and then placing it in communication with said induction zone.

7. A process according to claim 4 wherein said pressuring zone is pressured by partial displacement of the body of liquid present therein.

8. In an apparatus for the conveyance of solids which comprises an elongated conveyance conduit whose outlet is at a higher elevation than its inlet, inlet means for introducing solids and a liquid conveyance fluid into said inlet, and means for receiving solids and liquid from said outlet, the improvement which comprises a liquid-solids separating means associated with said means for receiving solids and fluid, a solids outlet and a separate liquid outlet from said separating means for said separated solids and liquids respectively, means for restricting the flow of solids from said solids outlet so as to maintain said solids in the form of a dense mass substantially at their static bulk density, said mass extending from said solids outlet to said conveyance conduit outlet and throughout said conveyance conduit, a liquid pump as the means for introducing the conveyance fluid into said inlet, and an elongated standpipe extending substantially from the liquid outlet from said separating means downwardly to the inlet to said pump.

9. An apparatus according to claim 8 in combination with a vent line opening from the upper end of said solids-liquid separating means.

10. An apparatus according to claim 8 in which said inlet means comprises an induction chamber and an arcuate conduit communicating the bottom thereof with the conveyance conduit inlet.

11. An apparatus according to claim 8 wherein said solids-liquid separating means comprises an inclined foraminate baffle disposed below said conveyance conduit outlet, said baffle being adapted to receive the solids and liquid leaving said conveyance conduit outlet and permit liquid to pass therethrough to said liquid outlet while permitting said mass of solids to flow by gravity across said baffle to said solids outlet.

12. An apparatus according to claim 10 in combination with a solids pressuring vessel opening downwardly into the top of said induction chamber through a valved conduit, a hopper opening downwardly through a valved conduit into the top of said pressuring vessel, operator means for actuating said valve conduits in a sequence whereby solids introduced into said hopper pass intermittently with said pressuring vessel and on into said induction chamber, and a second liquid pump connected at its inlet to said hopper and communicating at its outlet to the upper end of said standpipe.

13. An apparatus according to claim 12 wherein said valved conduits are provided each with a plug cock as the valve therein to permit a simultaneous countercurrent flow of solids downwardly and displaced conveyance liquid upwardly therethrough.

14. An apparatus according to claim 12 in combination with an elongated displacement rod extending through a packing gland into the liquid body filling said pressuring chamber, a diaphragm valve headworks connected to the other end of said rod, an actuating fluid line opening into and a fluid vent line opening from said headworks and provided with remotely operated valves, said valves being actuated by the cycle timer operator in sequence, and a vent line opening from said pressuring chamber to remove all gas pockets therefrom.

15. An apparatus according to claim 12 in combination with a liquid vent line and remotely actuated valve opening from said pressuring chamber upwardly into said hopper, a liquid pressuring line and a remotely actuated valve opening from the first named liquid pump discharge outlet into said pressuring chamber, said valves being actuated by the cycle timer operator to pressure and depressure said chamber.

16. An apparatus according to claim 8 in combination with a reservoir chamber connecting the liquid outlet of said solids-liquid separating chamber with the top of said standpipe, and means for keeping said standpipe full of liquid comprising a liquid level detector disposed in said reservoir, a liquid inlet opening into said reservoir for make up liquid, and a valve in said inlet responsive to said level detector.

17. An apparatus according to claim 10 in combination with a remotely operated valve in the discharge opening from said liquid pump, said valve being responsive to a pressure detector controller which in turn is connected to be responsive to and maintain the pressure in said induction chamber.

References Cited in the file of this patent

UNITED STATES PATENTS

| 2,616,521 | Berg | Nov. 4, 1952 |
| 2,684,870 | Berg | July 27, 1954 |
| 2,793,082 | Gardner | May 21, 1957 |

FOREIGN PATENTS

| 110,609 | Great Britain | Oct. 26, 1917 |
| 184,237 | Great Britain | July 31, 1922 |
| 587,335 | Great Britain | Apr. 22, 1947 |